June 25, 1968 G. R. KAMERER ETAL 3,390,339
PULSE RATE LIMITING CIRCUIT
Filed June 1, 1964
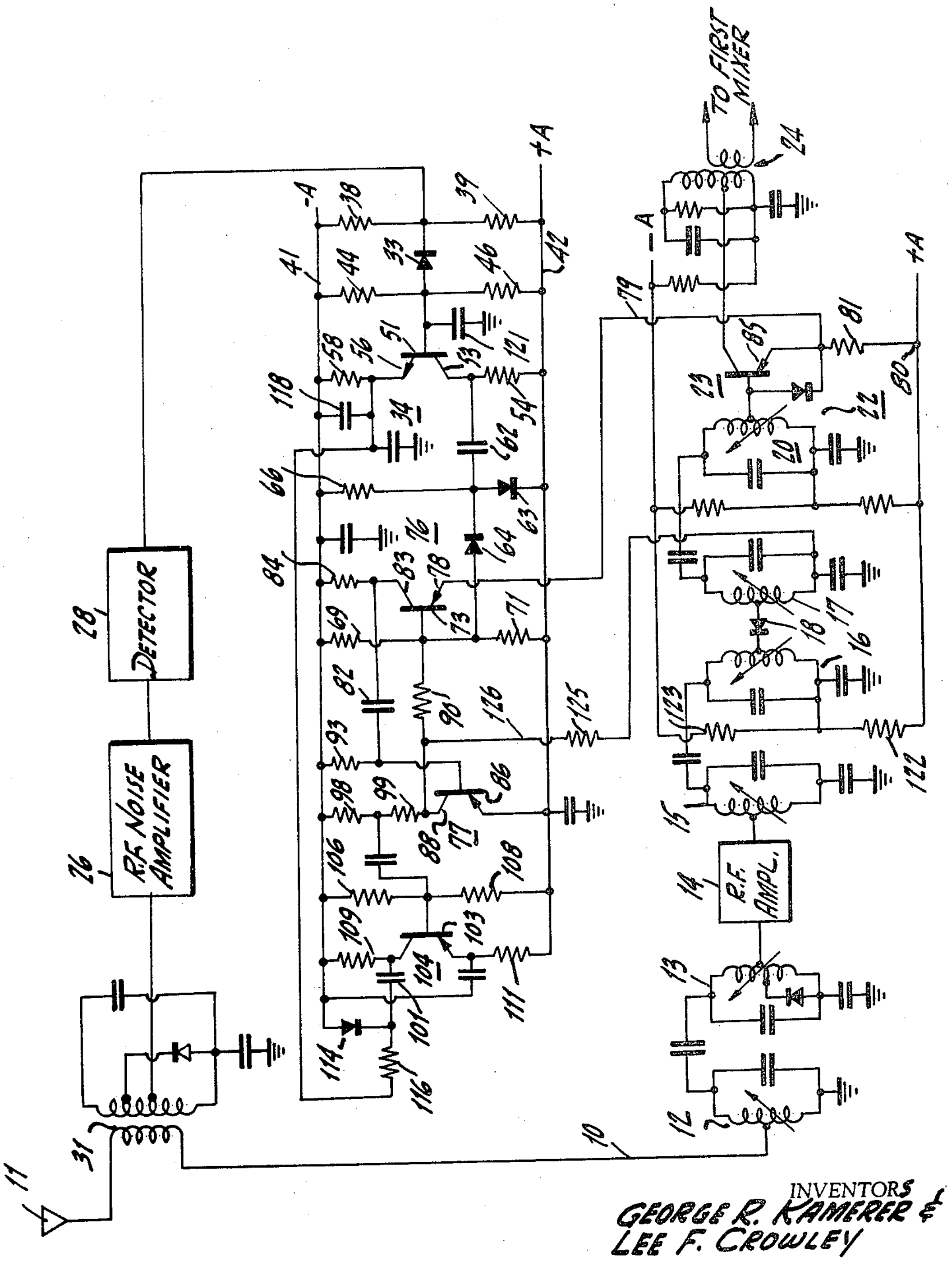
INVENTORS
GEORGE R. KAMERER &
LEE F. CROWLEY
BY George J. Craig
Attorney

United States Patent Office 3,390,339
Patented June 25, 1968

3,390,339

PULSE RATE LIMITING CIRCUIT

George R. Kamerer, McMurray, and Lee F. Crowley, Pittsburgh, Pa., assignors to Radio Corporation of America, a corporation of Delaware Filed June 1, 1964, Ser. No. 371,526
2 Claims. (Cl. 325—478)

ABSTRACT OF THE DISCLOSURE

This invention provides a rate limiting circuit for use in noise suppression circuits of radio receivers that is immune to overriding high amplitude noise pulses. The circuit is responsive only to a control signal proportional to the received noise pulse repetition rate to prevent receiver disabling when the rate increases. The received noise pulses are detected, limited and amplified to control a receiver switching pulse multivibrator. The multivibrator develops noise blanking signals to disable a receiver periodically at a relatively slow rate.

The present invention relates to improved means for the suppression of the interfering impulse-type noise pulses in radio apparatus, and more particularly to novel means for preventing disabling of the radio apparatus by intermodulation beat frequencies which produce high repetition rate pulses applied to the pulse suppression means.

An object of the present invention is to provide novel means for the suppression of the impulse-type noise pulses in radio apparatus.

Another object of the present invention is to provide novel means for preventing interruption of normal operation of radio apparatus equipped with means for suppression of impulse-type noise pulses.

Another object of the present invention is to provide novel means for the suppression of interfering impulse-type noise pulses in radio apparatus including an input pulse amplitude limiter for the impulse-type noise pulse suppression means.

A still further object of the present invention is to provide novel means for deriving an AGC (automatic gain control) voltage for an amplifier proportional to the repetition rate of amplifier input pulses.

A still further object of the present invention is to provide novel means for preventing interruption by rapidly recurring intermodulation beat frequencies of normal operation of radio apparatus equipped with means for suppression of interfering impulse-type noise pulses.

Means to prevent interference in radio receiving apparatus by undesired impulse-type noise pulses may disable the apparatus when intermodulation beat frequencies of high repetition rate are introduced into the impulse-type noise suppression means.

Means previously employed to prevent this effect required a manual operation to disable the interference preventing means. However, it is possible for the impulse-type noise interference preventing means to disable the radio receiving apparatus when triggered with high repetition rate intermodulation frequencies, without the operator's knowledge. Other means previously employed to prevent this effect were ineffective in the presence of high level intermodulation beat frequencies. This invention overcomes this deficiency by use of means responsive only to locally generated gating pulses in a novel manner for limiting the repetition rate response of the interference prevention means. The present invention eliminates the need for manual operation by automatically limiting the repetition rate response of the interference prevention means in a novel manner.

In accordance with the present invention, the received intermodulation beat frequency pulses are limited, amplified and employed to generate local pulses of fixed amplitude and having repetition rate as the only variable. The local pulses are rectified and integrated to provide a control voltage which limits the repetition rate of the local pulses to a fixed predetermined or selected value without interference from the received beat frequency pulses when the repetition rate of the intermodulation beat frequency pulses exceeds a selected value. The local pulses are also employed to cut off a signal channel in the apparatus with which the interfering impulse-type noise suppression means is associated. Since the repetition rate of the local pulses cannot exceed a predetermined value, significant interruption of operation of the associated radio apparatus does not occur.

The invention will be described in greater detail by reference to the accompanying drawing in which:

The single figure is a schematic circuit diagram of radio receiving apparatus embodying the interfering impulse-type noise suppression means of the present invention.

8 The R.F. (radio frequency) portion of a super-heterodyne receiver is coupled to an antenna input line 10 in turn coupled to an antenna 11, and comprises filter stages 12 and 13, an R.F. amplifier 14, filter stage 15, filter stages 16 and 17 connected by a diode 18, a second R.F. amplifier 22 including an R.F. tuned circuit 20 and a transistor 23, and an R.F. coupling transformer 24. These R.F. receiver elements may be of any known kind and need not be described further. However, the special function of the diode 18 and the amplifier 22 will be described later. This R.F. portion constitutes a communication signal channel.

A noise amplifying channel including an R.F. amplifier 26 and a detector 28 is coupled to the antenna line 10 and the antenna 11 by an R.F. transformer 31. The amplifier 26 raises the R.F. impulse noise to a value suitable for demodulation. The detected noise pulses from the detector 28 are coupled through a diode limiter 33 to a pulse amplifier comprising a transistor 34.

The R.F. portion of the receiver and the noise amplifying channel are tunable. In a receiver intended for mobile communication, the R.F. portion may be tunable from 25 mc. (megacycles per second) to 54 mc. The noise amplifying channel may be tunable from 30 to 52 mc. It is preferred that the noise amplifying channel be tuned to a different frequency than the frequency of the signal desired for reception. For example, if the desired signal frequency is 40 mc., the noise amplifier may be tuned to 43 mc. Tuning of both the receiver and noise amplifying channel is usually a factory adjustment so that the receiver is tuned to a single frequency assigned to a transmitter.

The detector 28 output pulses are positive going and are applied to the cathode of the diode limiter 33. The limiter 33 cathode is biased by bleeder resistors 38 and 39 connected in series between the supply voltage conductors 41 and 42. It will be understood that a connection from the negative terminal of the voltage source (not shown) is made to the conductor 41 and a connection from the positive terminal of suitable voltage is made to the conductor 42. The bias supply conductors and other sections of the apparatus are connected to ground, which may be the supporting chassis, by capacitors, not designated by reference characters, to provide complete A.C. paths. The limiter 33 anode is biased by resistors 44 and 46. The effect of the resistance network 38, 39, 44 and 46 is to apply a forward bias to the diode limiter 33.

The positive going pulse input to the limiter causes a decrease in the limiter current which, in turn, causes positive voltage pulses to appear at the limiter output. When the pulse input to the limiter exceeds the limiter forward bias there is no further decrease in limiter current and, therefore, no further increase in the positive pulses appearing at the limiter output. These latter pulses are applied to the base 51 of the pulse amplifier transistor 34.

The transistor 34 is shown, illustratively, as being an NPN junction transistor. Bias voltage for the collector 53 is provided by a resistor 54 from the positive conductor 42. The emitter 56 is biased through a resistor 58 from the negative conductor 41. The emitter is forward biased.

The output of the transistor 34 from the collector 53, a series of negative going pulses, is coupled by a capacitor 62 to the anode of a diode 63 and the cathode of a diode 64. The cathode of the diode 63 is connected to the positive conductor 42. Back bias to diode 63 is applied through a resistor 66 from the negative conductor to the diode 63. The capacitor 62 couples the output pulses from the transistor 34 to the base 73 of transistor 76, with the diode 63 suppressing the positive going portion of the pulses. Diode 64 is forward biased by the connection including the resistor 66 and resistors 69 and 71. The latter are base bias resistors for the base 73 of the transistor 76 of a monostable multivibrator of known type comprising transistors 76 and 77. The emitter 78 of the transistor 76 is reverse biased by way of a conductor 79 due to the voltage developed at emitter 85 of transistor 23 by the curernt flow through resistor 81. The latter is connected at 80 to the positive terminal of the supply voltage source. The function of the pulse transmitted over the conductor 79 is to be described later.

A feedback capacitor 82 provides one feedback path from the collector 83 and the load resistor 84 of the transistor 76 to the base 86 of the transistor 77. The other feedback path from the collector 88 of the transistor 77 to the base 73 of the transistor 76 is provided by the resistor 90. Base bias for the transistor 77 is applied through a resistor 93. The transistor 76 is cut off in the stable condition of the multivibrator. Pulses at its base 73 from the diode 64 cause the multivibrator to cycle to produce short pulses of constant time duration and constant amplitude.

A negative going pulse output, taken from between load resistors 98 and 99 for the collector 88 of the transistor 77, is coupled to the base 103 of a transistor 104 serving as a phase inverter and "rate amplifier." Biasing voltages are applied to the transistor 104 by base bias resistors 106 and 108, collector load resistor 109 and emitter bias resistor 111. The positive going pulse output from the transistor 104 is coupled through capacitor 101, clamped to the negative supply 41 by diode 114, and integrated by resistors 116, 109, and a capacitor 118. The output of this resistor capacitor network is a D.C. control voltage at the emitter 56 of transistor 34.

Development of this D.C. control voltage and the effect of its application to the transistor 34 is highly beneficial. In the absence of the transistor 104 and its output circuitry, high repetition rate pulses demodulated by the detector 28 would interrupt transmission of communication signals in the R.F. portion of the receiver.

When the intermodulation produced pulse repetition rate exceeds a predetermined value, the applied D.C. voltage at the emitter 56 of the transistor 34 increases in the positive direction and becomes higher than the voltage at the base 51. The base voltage is held constant by the relatively large bleeder current through the resistors 44 and 46. The gain of the transistor 34 decreases and stops triggering the multivibrator. When the multivibrator stops, the signal to the transistor 104 ceases and the D.C. voltage at the emitter 56 is reduced. This action restores the gain of transistor 34, allowing the same action to repeat as long as the high-repetition rate is sufficient to cause development of enough D.C. control voltage to drop the gain of the transistor 34. At low pulse repetition rates the D.C. control voltage is too small to cause any noticeable reduction in gain of the transistor 34.

When the transistor 34 is cut off by the applied D.C. signal the base to emitter impedance increases. A capacitor 121 limits this change in impedance so that the load impedance on the diode 33 is substantially constant.

The previously described diode 18 coupling the filter stages 16 and 17 in the radio frequency portion of the receiver is cut off by gating pulses from the collector 88 of the transistor 77. The diode 18 is forward biased by the resistors 98 and 99 and a voltage divider comprised of resistors 122 and 123. A resistor 125 is interposed in the conductor 126 which couples the collector 88 to the anode of the diode 18. Each negative going gating pulse from the collector 88 biases the diode momentarily to cut off, thereby interrupting transmission of communication signals through the R.F. portion of the receiver.

Interruption of communication signal transmission also occurs substantially simultaneously by momentary cut-off of the transistor 23 by a gating pulse developed across the resistor 81 when the transistor 76 goes into conduction, momentarily, with each pulse received from the amplifier 34.

By way of example, the capacitors designated by reference characters in the single figure of the drawing may have the following values:

| | | |
|---|---|---|
| Capacitor **62** | mfd | .0018 |
| Capacitor **82** | pfd | 220 |
| Capacitor **118** | mfd | 15 |
| Capacitor **121** | pfd | 220 |

By way of example, the resistors may have the following values:

| | Ohms |
|---|---|
| Resistor **38** | 1.6K |
| Resistor **39** | 22.0K |
| Resistor **44** | 2.4K |
| Resistor **46** | 15.0K |
| Resistor **54** | 3.9K |
| Resistor **58** | 1.0K |
| Resistor **66** | 220.0K |
| Resistor **69** | 27.0K |
| Resistor **71** | 1.2K |
| Resistor **81** | 470 |
| Resistor **84** | 2.4K |
| Resistor **90** | 6.8K |
| Resistor **93** | 47.0K |
| Resistor **98** | 330.0 |
| Resistor **99** | 1.2K |
| Resistor **106** | 22.0K |
| Resistor **108** | 1.0K |
| Resistor **109** | 1.0K |
| Resistor **111** | 100.0 |
| Resistor **116** | 1.0K |
| Resistor **122** | 1.2K |
| Resistor **123** | 4.7K |
| Resistor **125** | 1.0K |

With the listed values for the components, the voltage at conductor 42 is 11.25 volts positive with respect to the conductor 41.

What is claimed is:

1. A noise pulse interference suppressor for suppression of impulse-type noise pulses in radio apparatus comprising,
   detecting means for impulse-type noise pulses,
   a monostable multivibrator for generating gating pulses of constant amplitude and constant time duration,
   an amplifier comprising a transistor having a base, collector and emitter electrodes,
   first and second terminals adapted to be coupled to an external power source,
   means coupled across said terminal for applying operating bias to said electrodes,
   a diode having an anode and a cathode, means coupling said detecting means to the cathode of said diode, first and second resistive voltage dividers connected across said terminals,
   means connecting the cathode of said diode between the ends of said first voltage divider, and means connecting the anode of said diode between the ends of said second voltage divider, means coupling said base electrode to the anode of said diode, the resistive value of said voltage dividers being arranged to forward bias said diode and to provide sufficient bleeder current through said second voltage divider to hold the base potential of said transistor relatively constant when said noise pulses from said detecting means exceeds said forward bias, means coupling said multivibrator to said collector to trigger said multivibrator in accordance with the pulse rate of said impulse-type pulses, a second amplifier comprising a transistor having a base, collector and emitter electrodes coupled to receive pulses from said multivibrator, a second diode coupled to said collector of said second amplifier to clamp amplified pulses to a predetermined voltage level, an integrating network coupled to said second diode to develop a direct current control voltage, and means coupling said integrator network to said emitter of said first amplifier to only vary the bias on said emitter electrode to cut off said amplifier periodically when the pulse rate of said second amplifier exceeds a predetermined value regardless of the detected pulse level.

2. Radio apparatus having means for connection to an antenna comprising, a radio frequency amplifier coupled to said antenna, said radio frequency amplifier having a plurality of amplifier stages, one of said stages comprising a transistor having collector, base and emitter electrodes, first and second terminals adapted to be coupled to an external power source, means coupled across said terminals for applying an operating bias to said electrodes, diode coupling means between two of said stages, a noise amplifying channel for amplifying impulse-type noise pulses coupled to said antenna, detecting means for impulse-type noise coupled to said noise amplifying channel, a monostable multivibrator for generating gating pulses of constant amplitude and constant time duration, a second amplifier comprising a second transistor having a base, collector and emitter electrodes, means coupled across said terminals for applying operating bias to said electrodes of said second transistor, a diode limiter having an anode and a cathode, means coupling said detecting means to the cathode of said diode limiter, first and second resistive voltage dividers connected across said terminals, means connecting the cathode of said diode between the ends of said first voltage divider, means connecting the anode of said diode limiter between the ends of said second voltage divider, means coupling said base of said second transistor to the anode of said diode limiter, the resistive values of said voltage dividers being arranged to forward bias said diode limiter and to provide sufficient bleeder current through said second resistive voltage divider to hold the base of said second transistor relatively constant when said noise pulses from said detecting means exceeds said second bias, means coupling said collector of said second transistor to said multivibrator to trigger said multivibrator in accordance with the pulse rate of said impulse-type noise pulses, a third amplifier comprising a third transistor having a base, collector and emitter electrodes, means coupled across said terminals for applying an operating bias to said electrodes of said third transistor, means coupling said base of said third transistor to said multivibrator to amplify multivibrator pulses, a second diode coupled to said collector of said third transistor to clamp said amplified pulses to the potential of the negative pole of said operating bias applying means, an integrating network coupled to said diode to develop a direct current control voltage, means coupling said integrator network solely to said emitter of said second named transistor to vary the bias on said emitter electrode to cut off said amplifier periodically when the pulse rate of said multivibrator pulses exceeds a predetermined value regardless of said noise pulse level, means coupled at the base of said second transistor for limiting the base to emitter impedance change when said second transistor is cut off so that the load impedance of said diode limiter is substantially constant, means coupling said multivibrator to said emitter of said first named transistor to cut off said transistor upon occurrence of each gating pulse generated by said multivibrator, and means coupling said multivibrator to said first named diode to cut off said diode upon occurrence of each gating pulse generated by said multivibrator, cut-off of said first transistor and said diode interrupting said radio frequency amplifier.

References Cited

UNITED STATES PATENTS

| | | | |
|---|---|---|---|
| 3,140,446 | 7/1964 | Myers et al. | 325—478 |
| 3,191,123 | 6/1965 | Eness et al. | 325—478 |

OTHER REFERENCES

Terman, F. E., Electronic and Radio Engineering, 4th ed., McGraw-Hill, 1955 pp. 644–646 and 789–791.

KATHLEEN H. CLAFFY, *Primary Examiner.*

R. LINN, *Assistant Examiner.*